United States Patent
Pagliacci et al.

(10) Patent No.: US 10,816,820 B2
(45) Date of Patent: Oct. 27, 2020

(54) FRAME FOR GLASSES WITH A CLOSED POSITION FOR LENS PROTECTION FROM IMPACT OR RUBBING

(71) Applicants: Gianfilippo Pagliacci, Milan (IT); Diego Ponzetto, Paderno Dugnano (IT); Giuseppe Pizzuto, Palermo (IT); Dario Maria Fumagalli, Milan (IT); Luca Silvestri, Mogliano Veneto (IT)

(72) Inventors: Gianfilippo Pagliacci, Milan (IT); Diego Ponzetto, Paderno Dugnano (IT); Giuseppe Pizzuto, Palermo (IT); Dario Maria Fumagalli, Milan (IT); Luca Silvestri, Mogliano Veneto (IT)

(73) Assignee: MB LICENSING S.R.L., Milan (IT)

( * ) Notice: Subject to any disclaimer, the term of this patent is extended or adjusted under 35 U.S.C. 154(b) by 98 days.

(21) Appl. No.: 15/781,314

(22) PCT Filed: Dec. 2, 2016

(86) PCT No.: PCT/IB2016/057320
§ 371 (c)(1),
(2) Date: Jun. 4, 2018

(87) PCT Pub. No.: WO2017/093970
PCT Pub. Date: Jun. 8, 2017

(65) Prior Publication Data
US 2018/0364496 A1    Dec. 20, 2018

(30) Foreign Application Priority Data
Dec. 4, 2015   (IT) .................. 102015000080614

(51) Int. Cl.
*G02C 5/00*   (2006.01)
*G02C 5/22*   (2006.01)
*G02C 5/20*   (2006.01)

(52) U.S. Cl.
CPC ............... *G02C 5/006* (2013.01); *G02C 5/20* (2013.01); *G02C 5/2263* (2013.01); *G02C 2200/06* (2013.01)

(58) Field of Classification Search
CPC ........ G02C 5/006; G02C 5/20; G02C 5/2263; G02C 2200/06
(Continued)

(56) References Cited

U.S. PATENT DOCUMENTS 3,049,974 A    8/1962   Yukio
5,638,146 A *  6/1997   Nannini ................ G02C 5/006
                                                      351/63

(Continued)

FOREIGN PATENT DOCUMENTS

EP     1 008 888 A1    6/2000
EP     2 590 006 A1    5/2013

(Continued)

OTHER PUBLICATIONS

International Search Report, dated May 11, 2017, from corresponding PCT/IB2016/057320 application.

*Primary Examiner* — Tuyen Tra
(74) *Attorney, Agent, or Firm* — Nixon & Vanderhye

(57) ABSTRACT

Disclosed is a frame for glasses with a front-piece, two temples connected each to the front-piece by a hinge which allows the rotation of the temples from a working position which is substantially perpendicular to the front-piece, when wearing the glasses, up to a rest position which is substantially parallel to the front-piece, when putting the glasses away. The front-piece includes two rims for supporting the lenses, and possibly a bridge connecting the rims. A pivot allows one of the temples or overturning temple and the relative hinge to rotate about an overturning axis substantially parallel to the front-piece. The overturning axis has a set inclination with respect to a straight line passing through (Continued)

the two centers of the rims, the inclination having a value that ranges from 2.5° to 25° and preferably from 5° to 25°.

20 Claims, 3 Drawing Sheets

(58) Field of Classification Search
USPC .......................................... 351/41, 111, 115
See application file for complete search history.

(56) References Cited

U.S. PATENT DOCUMENTS

| | | | |
|---|---|---|---|
| 6,102,541 | A | 8/2000 | Kuo |
| 6,257,720 | B1 | 7/2001 | Ozawa |
| 6,530,660 | B1 | 3/2003 | Chao et al. |
| 6,817,710 | B2 * | 11/2004 | Benavides ............. G02C 5/001 351/113 |
| 9,470,907 | B2 * | 10/2016 | Esmaeili ................... G02C 9/02 |
| 10,429,667 | B2 * | 10/2019 | Pagliacci ................. G02C 5/14 |
| 2004/0141148 | A1 | 7/2004 | Chou |
| 2005/0146675 | A1 | 7/2005 | Benavides |

FOREIGN PATENT DOCUMENTS

| | | | |
|---|---|---|---|
| GB | 458 990 | A | 12/1936 |
| GB | 1 372 417 | A | 10/1974 |
| WO | 2004/019112 | A1 | 3/2004 |

\* cited by examiner

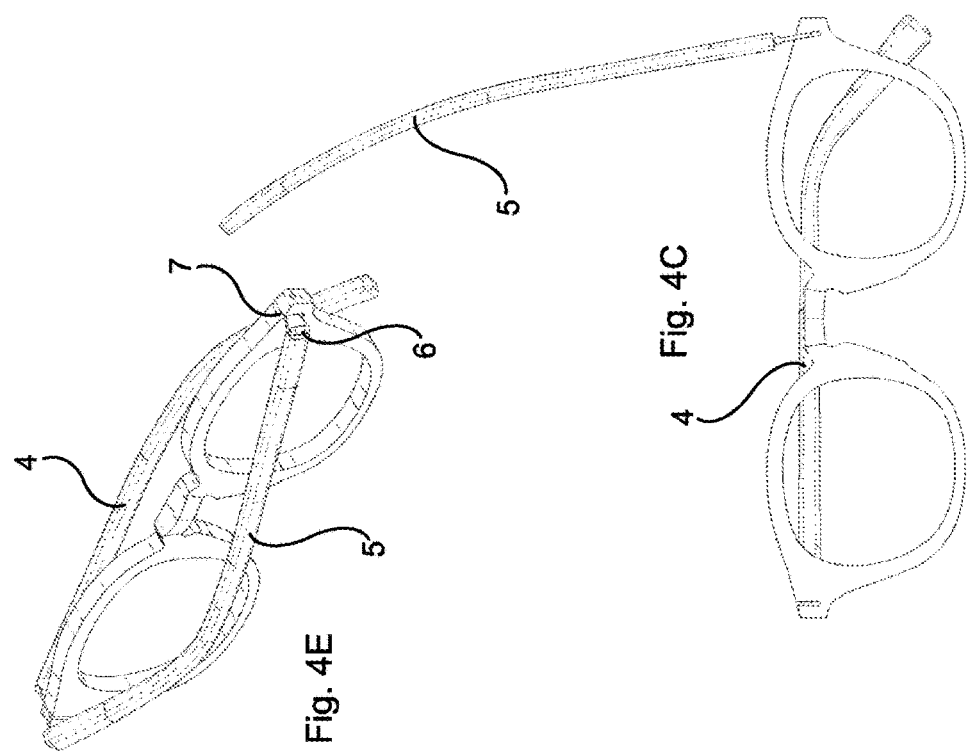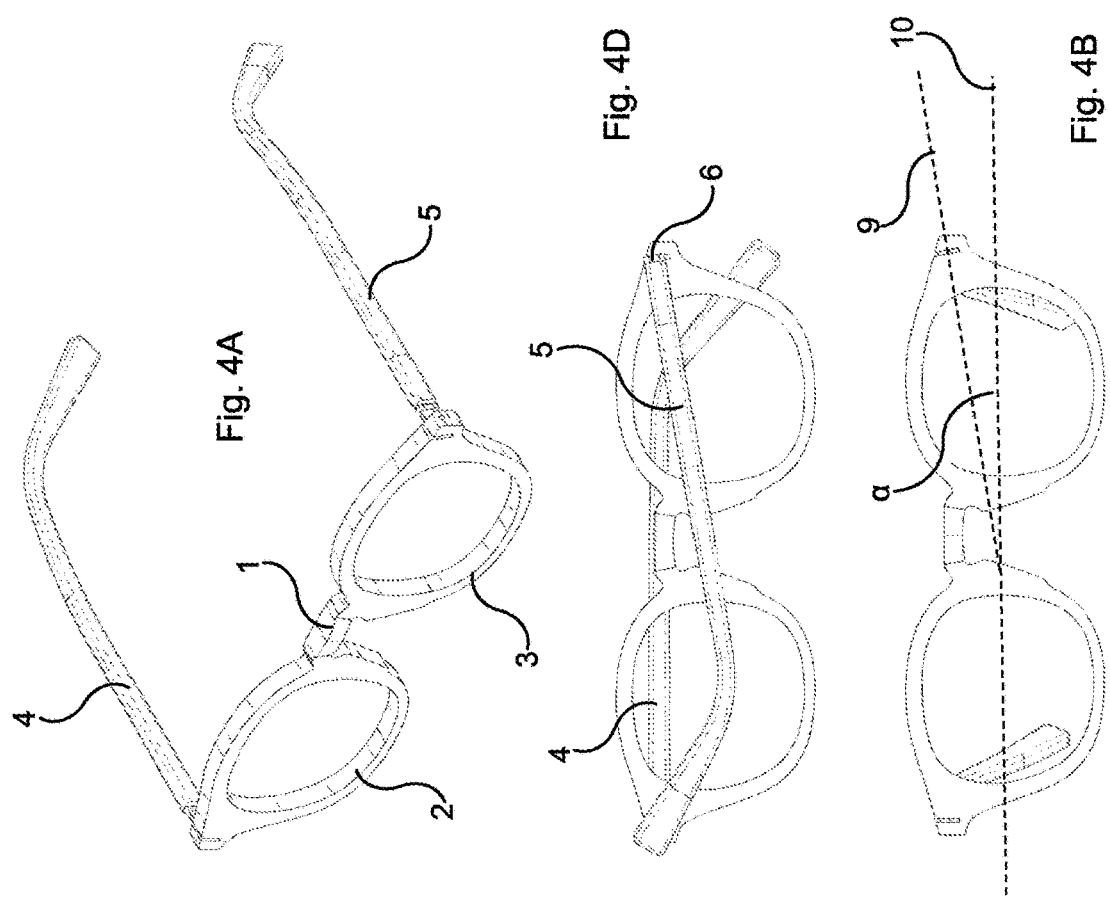

FRAME FOR GLASSES WITH A CLOSED POSITION FOR LENS PROTECTION FROM IMPACT OR RUBBING

The present invention refers to a frame for glasses with a closed position for lens protection from impact or rubbing. In particular, the invention relates to a frame for glasses of a completely new concept, capable of providing an excellent protection for the lenses when the glasses are not worn and they are placed on a support in a closed position, without being inserted into a case.

FIELD OF THE INVENTION

It is known that in the daily use of glasses, be they sunshades or prescription glasses, there is often the need to take them off and put them back on, depending on the conditions of use or of the surrounding environment.

When taking off the glasses, it is often usual to place them onto the first available horizontal surface, for example on top of a piece of furniture or a table, onto an armchair or a bed. Thereby, rarely does one have the time and the attention to gently and correctly place them—be it closed, that is having the folded temples in contact with the supporting surface, or instead be it open, lying with their rim lower edges and the temple ends on the surface or, more stably, lying upside down, with the front-piece and the temple upper edges on the surface—in any case in such a position that the lenses do not come in contact with the supporting surface and hence do not risk being damaged therefrom.

More frequently, in fact, glasses are casually placed, due to hurry, lack of attention or carelessness, and hence the lenses often risk to be damaged by impacts or rubbing against the supporting surface itself or against the surrounding objects.

The only currently available means to surely avoid any damage to the lenses is to put glasses into their specific case upon taking them off. However, such an operation is too long and complicated to be carried out, at least in the fast context of modern social life, both because such a case is not always immediately available, and because the glasses often need to be rapidly taken off and put on in succession a certain number of times, depending on the conditions of use, and it is therefore easier to give up this more complete protection, against the greater ease of an immediate support on the first available surface.

STATE OF THE ART

U.S. Pat. No. 6,257,720 discloses a frame for glasses comprising pivoting means housed in the bridge which connects the two rims. Such pivoting means allow the mutual rotation of the two rims of the frame—and of the temples hinged thereto—about a rotational axis passing through said bridge, so that after rotating one of the two rims relative to each other, the two temples are located on opposite sides of the glasses and can therefore provide protection to the lenses.

The solution disclosed by this patent, although interesting from the general concept viewpoint, is nevertheless not suitable for a satisfactory application in practice. It is well known, in fact, that the bridge which connects the two rims in a pair of glasses is located at the upper part of the frame, being in contact with the user's nose or slightly above it, substantially aligned to the upper arc of said rims. It is hence evident that, performing the 180° rotation of one rim with respect to the other, about a rotational axis passing through said bridge, when said rotation is terminated the two rims together with the relative temples will be completely misaligned.

The stated object of the patent cannot thereby be reached, since in the rotated rim position each temple still solely protects—as it already happens in conventional glasses—the inner part of the lens which is in a proximal position with respect to its hinge, but instead it fails to protect with its terminal portion—as it was declared in the stated patent objects—the outer part of the lens which is in a distal position with respect to its hinge, because the rim containing said lens, while rotating of 180°, overturns itself with respect to the bridge, therefore going completely out of alignment with respect to the position occupied by the terminal portion of the other rim temple. Consequently, the outer part of the lenses does not receive any proper protection from the temple terminal portion in the above described overturned position described above, and this does not allow to achieve the improvement disclosed in the patent in question, in relation to to the previous situation.

In addition, it should be noticed that in the above-said 180° overturned position of the two rims, the glasses take a completely disordered shape, the two rims being completely offset at opposite sides in respect of the axis of rotation about the glasses bridge and the terminal portion of the relative temples goes thereby to occupy a substantially empty space. In other words, the bulk of the glasses on the plane whereon the two rims lie is substantially doubled, with evident negative consequences both on the side of comfort in putting away or handling the glasses, and on the aesthetic side.

WO-2004/019112 discloses reading glasses frames in which at least one of the two temples can be overturned about a horizontal axis perpendicular to the temple and parallel to the front-piece plane, so as to allow the temple to rotate of 180° towards an opposed position in respect of the one of normal use and then to fold it over the lenses, on the glasses front side, thus providing protection to both sides of the lenses. Fully similar solutions to that disclosed in this patent were, however, already known since long, as disclosed for example by EP 2590006, US 2004/0141148, U.S. Pat. No. 6,102,541, EP 1008888, U.S. Pat. No. 3,049,974, GB 458990.

As it is evident from the examination of all the above mentioned earlier documents, an essential common condition in order to make successfully applicable such lens protection solutions is that the glasses are characterized by low hight lenses—as typically happens for reading glasses for presbyopia—and by temples which are hinged at a central position of said lenses, said lenses preferably having a rectilinear shape. Thanks to this shape, in fact, in this type of glasses the 180° back-front rotation of one of the temples brings said temple onto the front of the glasses front-piece into a perfectly symmetrical position compared to the one taken by the other temple that folds in a conventional manner onto the front-piece back, thus ensuring the desired protection to the lenses.

On the contrary, in standard sunshades or prescription glasses provided with rims having such an height to ensure the visual correction in any wide viewing angle, the temples are more often hinged near to the upper edge of the rims; said temples also have a moderate lateral convexity and also a marked downward bend at their end, to better adapt to the user's face shape and, respectively, to engage more firmly in the area behind the ear. When a temple of this standard type of glasses is folded in a conventional manner onto the glasses front-piece back, the above described shape ensures that the temple go across the two lenses in a diagonal direction thus providing an excellent protection to the lenses themselves. Where instead one of the glasses temples should be overturned and then folded onto the glasses front-piece front, as proposed in the above prior documents, the overturned temple would be also positioned in a diagonal direction, but such direction would develop starting from the upper edge of the glasses, nearby the hinge, outside the glasses, according to a path substantially parallel to the one of the temple folded onto the glasses back. Such a position would therefore be completely ineffective to the purpose of protecting the lenses and, moreover, not at all compact and therefore very uncomfortable in use.

An object of the present invention is hence to provide a frame for glasses which offers the same innovative performances which have been proposed for the frames disclosed in the above mentioned previous patents, without suffering from limitations about the frame shape and the hinge position of the temples. In particular then, a frame for glasses which allows to avoid, in a very simple and immediate manner, the risk of lens damage when putting the glasses in a closed position onto a supporting plane.

Another object of the present invention is to offer a frame for glasses which enjoys such innovative performances regardless of the frame material, that is, in particular, both for plastic frames and metal or composite material frames, and of the specific glasses model.

These objects are achieved by means of a frame for glasses of the type comprising a front-piece, two temples connected each to said front-piece by a hinge which allows the rotation of the temples from a working position which is substantially perpendicular to the front-piece, when wearing the glasses, up to a rest position which is substantially parallel to the front-piece, when putting the glasses away, said front-piece comprising two rims for supporting the lenses and possibly a bridge connecting said rims and wherein pivoting means are further provided which allow one of said temples and the relative hinge to rotate about a rotational axis which is substantially parallel to said front-piece. The frame of the present invention is characterized in that said rotational axis has a set inclination with respect to a straight line passing through the two centres of said rims, said inclination having a value that ranges from 2.5° to 25° and preferably from 5° to 25°. The value of said inclination is selected within this range in such a way that the temple positioned in the 180° rotated position about said rotational axis, and then folded in a rest position about its hinge, fully overlaps the frame front-piece. Other preferred features of such frame are defined in the dependent claims.

BRIEF DESCRIPTION OF THE DRAWINGS

Further features and advantages of the frame according to the present invention will in any case be more evident from the following detailed description of some preferred embodiments of the same, given as a mere and non-limiting example and illustrated in the attached drawings, wherein:

FIG. 4A is a schematic perspective view of a frame for glasses according to a second embodiment of the present invention, with the temples into a open working position;

FIG. 4B is a schematic front view of the frame of FIG. 4A;

FIG. 4C is a view of the frame of FIG. 4A with one of the temples rotated of about 90° with respect to its normal working position, about a rotational axis which is parallel to the front-piece;

FIG. 4D is a view of the frame of FIG. 4B with said temple further rotated of 90° about said rotational axis and folded onto the front-piece front; and FIG. 4E is a schematic perspective view of the frame of FIG. 4D.

DETAILED DESCRIPTION OF THE PREFERRED EMBODIMENTS

Figure 1:
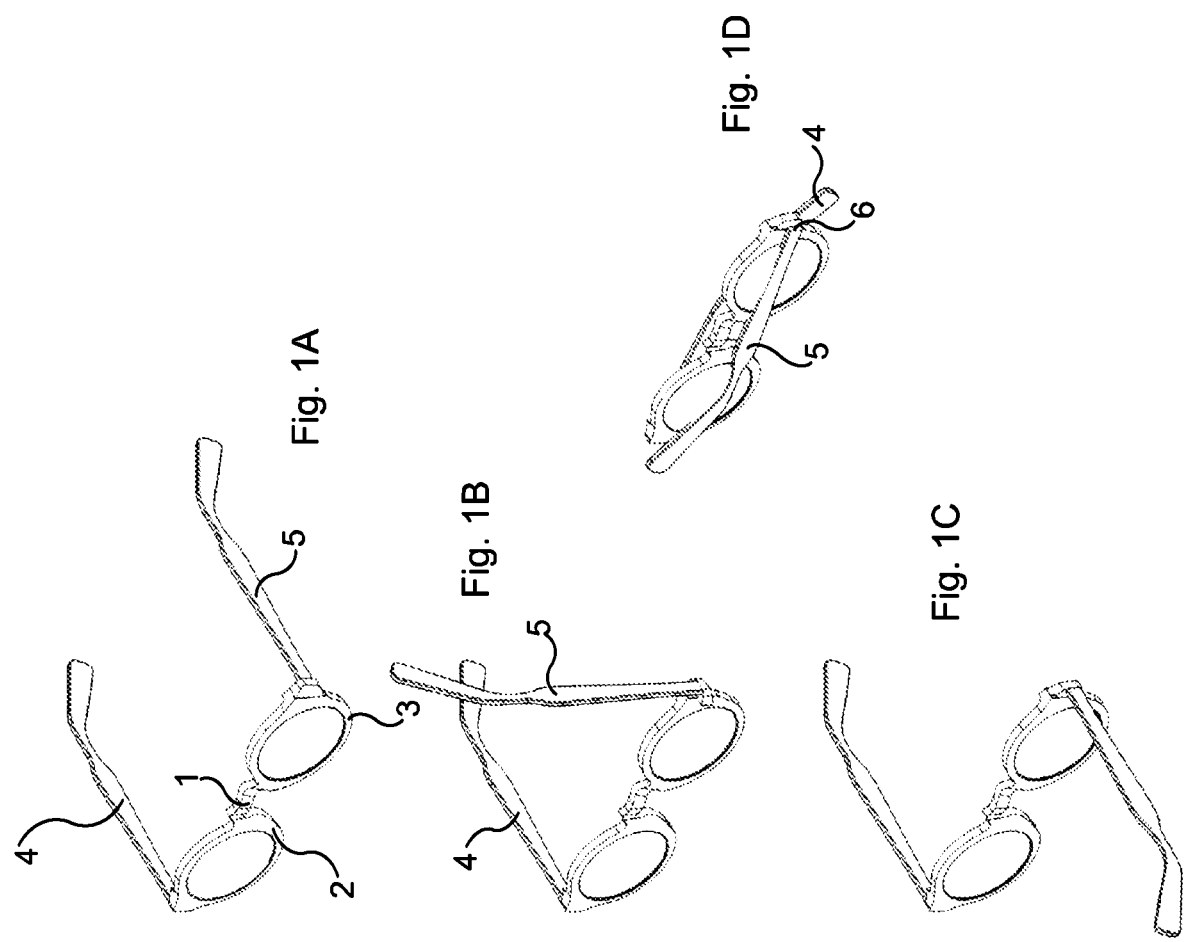
FIG. 1A is a schematic perspective view of a frame for glasses according to a first embodiment of the present invention, with the temples in a open working position.
FIG. 1B is a view of the frame of FIG. 1A with one of the temples rotated of 90° with respect to its normal working position, about a rotational axis which is parallel to the front-piece.
FIG. 1C is a view of the frame of FIG. 1B with said temple further rotated of 90° about said rotational axis.
FIG. 1D is a view of the frame of FIG. 1C with both the temples folded into a rest position.

As shown in the drawings, the frame for glasses according to the present invention looks like any other frame currently used on the market, when in a working position, and it is not limited to a specific design of the rims or of the temples. Accordingly, such frame comprises all the usual components of conventional glasses and, in particular: a front-piece comprising two rims 2, 3, centrally connected by a bridge 1, the outer edge of said rims, the so-called end piece, bearing conventional hinges for two respective temples 4 and 5.

According to the general idea of solution of the present invention, in order to overcome the drawbacks of the above described prior art and thus achieve the desired object of a complete protection for both sides of the lenses, one of said temples, and precisely the foldable temple 5 in the drawings, is provided with pivoting means about an overturning axis 9, which allow the temple itself to rotate of at least 180°, so as to move to the opposite side in respect to the one of normal use. When, being the temple 5 in this latter overturned position, the temple 5 is folded on its usual hinge 6, it moves in a protective position of the lenses front.

According to the innovative feature of the present invention, overturning axis 9 is not parallel to the straight line 10 passing through the centres of the two rims 2 and 3—as it happens in all the frames for glasses according to the prior art illustrated above—but has a set inclination a with respect to this straight line; such an inclination is comprised in the range from 2.5° to 25° and preferably from 5° to 25°, depending on the size of the glasses and in particular on the distance between the temple pivoting point about the overturning axis 9 and the straight line 10 passing through the centre of the glasses. From experimental studies undertaken by the Applicants it has been also possible to establish that the a inclination of overturning axis 9 in degrees is directly proportional to the above said distance in millimetres, according to a proportionality coefficient K comprised between 1 and 2.

Figure 2:
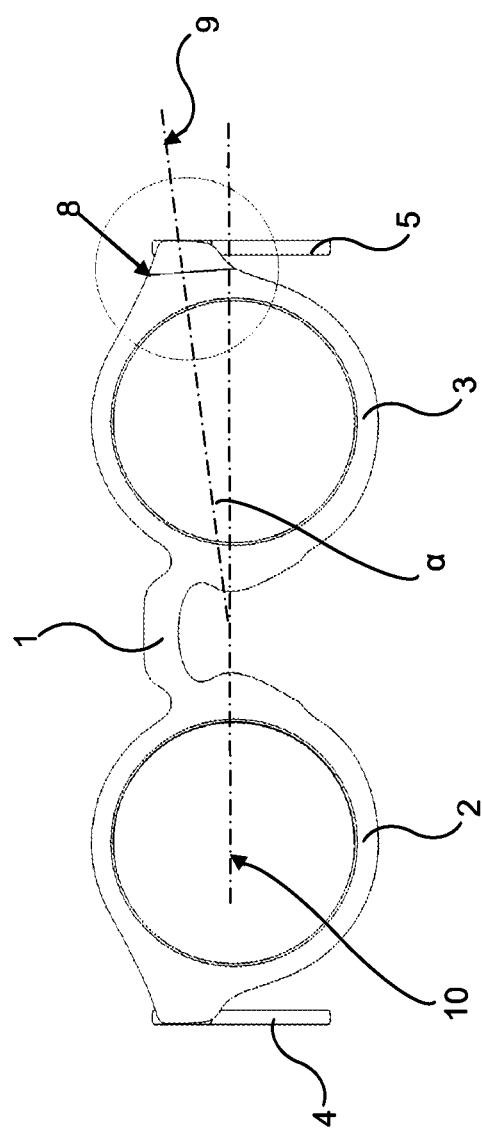
FIG. 2 is a front view of the frame for glasses according to this invention, with the temples in an open working position.
Figure 3:
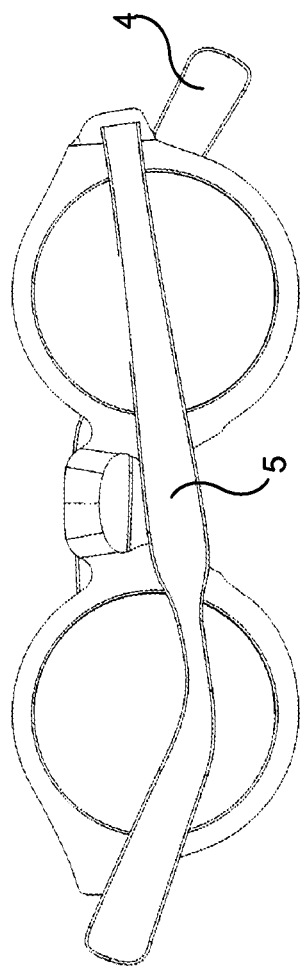
FIG. 3 is a view similar to FIG. 2, with both the temples rotated into a rest position and one of the two temples rotated of 180° about said rotational axis.

In the first embodiment of the frame for glasses of the present invention, illustrated in FIGS. 1 to 3, the inclination of axis 9 is determined by the corresponding inclination with which the frame front-piece is cut at the joining area with the end piece, to provide a flat surface 8 onto which the mutual rotation between the temple 5 with relative hinge 6 and the remaining part of the frame front-piece takes place, about a pivot, parallel to axis 9, inserted into the glasses body. Axis 9 is obviously perpendicular to said flat surface 8. When said rims do not have a regular circular shape, as a "centre" of the rims 2, 3 a point arranged in a central position of the rims and equidistant from the upper and lower limit points of the rims is meant.

In the second embodiment of the frame according to the present invention, illustrated in FIG. 4, the axis 9 inclination is determined by the corresponding inclination of a notch 7 formed in the end piece area of the front-piece. Notch 7 is bounded by a pair of opposing flat surfaces between which one perforated end of temple 5 is inserted, which temple end is coupled to a pivot which passes through the notch 7 and is perpendicular to its walls. Notch 7 can be open upwards, as shown in the drawings, or on the contrary open downwards; in both cases it allows a 180° rotation of temple 5, respectively over the front-piece or under it.

Thanks to the special construction of the frames for glasses described above, the bilateral protection of the lenses provided by the two temples of the glasses—which in the prior art was solely limited to glasses having temples hinged at a central position of the rims—can thus be also applied to frames according to any other models of glasses in which the temples are usually hinged at the upper edge of the rims 2 and 3. As a matter of fact, by suitably selecting the value of the angle α of overturning axis 9 within the range of values indicated above, it is therefore possible to make the temple 5, in its 180° overturned position, to completely overlap the rim 2, instead of having its end portion completely out of the same, so duly protecting this rim lens, as illustrated in FIGS. 1D, 3, 4D and 4E.

When temple 5 is in its completely overturned position, and also the second temple 4 of the frame is folded in its rest position, through its usual rotational movement, the two temples will overlap the lenses on opposite sides of the front-piece body, perfectly centred on the lenses themselves; in other words, and more precisely, temple 5 will go to overlap and protect the front-piece front side, while temple 4 will remain to protect, in a known way, its back side. It should be noted that the overturning of the group consisting of temple 5 and the relative hinge 6 is per se sufficient to compensate for the "thickness" of the glasses, caused in particular also by the curvature of the lenses, thus allowing a particularly compact configuration of the glasses.

This position is here defined as "safety position"; in fact, whatever the plane on which the user places or even drops the glasses be, the lenses will be always protected and kept spaced from the supporting plane by temple 4 in the usual closed position and temple 5 in the overturned position. Practical tests have shown that, even if the glasses are accidentally dropped on the floor, closed in this safety position, any damage of the lenses is avoided. Since in fact the impact, in any position of fall, only affects the frame and not directly the lenses, the own elasticity of the frame material is sufficient to absorb the impact energy discharging it on the lenses in a peripheral and distributed manner, and therefore without causing any damage to them.

Temple 5 pivoting means preferably have positioning means apt to determine a stable halting position of temple 5 in correspondence of its normal position of use, to overcome which a certain force is needed. Also other halting positions of said pivoting means, for example every 90°, are preferably provided in the further rotation of temple 5 about the overturning axis 9, in order to facilitate the correct safety closure mode of the frame for glasses of the present invention and to make the user immediately guessed of it, in addition to keep temple 5 in a stable position in all the different positions it goes to take during its rotation about the overturning axis 9.

From the above description it clearly appears how the frame of the present invention has fully achieved both the intended objects, namely that of providing a complete protection of both sides of a glasses lenses, when one of the temples is in the 180° fully overturned position with respect to its normal folded position, regardless of the material the frame is made of, its shape and the position the temples are hinged at, with respect to the rims.

It is understood that the invention is not to be considered as limited to the particular arrangements illustrated above, which only represent exemplary embodiments of the same, but that several variants are possible, all within the reach of a skilled man in the field—in particular with reference to the configuration of the pivoting means which allow the rotation about overturning axis 9 of temple 5 with relative hinge 6, which may have any structure suitable for the purpose—without falling out of the scope of the invention itself, which is exclusively defined by the following claims.

The invention claimed is:

1. A frame for glasses comprising:
   a front-piece,
   two temples (4, 5) connected each to said front-piece by a hinge (6) which allows the rotation of the temples (4, 5) from a working position which is substantially perpendicular to the front-piece, when wearing the glasses, up to a rest position which is substantially parallel to the front-piece, when putting the glasses away, said front-piece comprising two rims (2, 3) for supporting the lenses, and
   pivoting means which allow one of said temples or overturning temple (5) and the relative hinge (6) to rotate about an overturning axis (9) which is substantially parallel to said front-piece,
   wherein said overturning axis (9) has a set inclination (α) with respect to a straight line (10) passing through the two centers of said rims (2,3), said set inclination (α) having a value that ranges from 2.5° to 25°.

2. The frame for glasses as in claim 1, wherein said set inclination (α), in degrees, is directly proportional to the distance, in millimetres, between the pivoting point of said overturning temple (5) on the overturning axis (9) and said straight line (10) which passes through the two centers of said rims (2, 3), according to a coefficient of proportionality (K) comprised between 1 and 2.

3. The frame for glasses as in claim 2, furthermore comprising positioning means apt to determine a stable rotation-halting position of said overturning temple (5), about said overturning axis (9), at its ordinary working position.

4. The frame for glasses as in claim 2, wherein said set inclination (α) of the overturning axis of said overturning temple (5) is determined by the corresponding inclination according to which the front-piece of the frame is cut, in order to accomplish a planar surface (8), perpendicular to said axis (9), on which the mutual rotation occurs between said overturning temple (5) with the relative hinge (6) and the remaining part of the frame front-piece.

5. The frame for glasses as in claim 2, wherein said set inclination (α) of the overturning axis (9) of said overturning temple (5) is determined by the corresponding inclination according to which a notch (7) is provided in the end piece of the frame front-piece in order to form a pair of opposite flat surfaces, perpendicular to said axis (9), between which is pivoted the perforated end of said overturning temple (5)

to determine the mutual rotation between said overturning temple (5) with the relative hinge (6), and the remaining part of the frame front-piece.

6. The frame for glasses as in claim 2, wherein the value of said set inclination ($\alpha$) of the overturning axis (9) is selected, within the above mentioned range of values, so that said overturning temple (5), after being 180° overturned and furthermore folded into the rest position about its hinge, fully overlaps, with its terminal portion, a rim (2, 3) of the frame.

7. The frame for glasses as in claim 1, furthermore comprising positioning means apt to determine a stable rotation-halting position of said overturning temple (5), about said overturning axis (9), at its ordinary working position.

8. The frame for glasses as in claim 7, wherein said positioning means are apt to determine further stable rotation-halting positions of said overturning temple (5) about said overturning axis (9), in the rotation of said overturning temple beyond its ordinary working position.

9. The frame for glasses as in claim 8, wherein said set inclination ($\alpha$) of the overturning axis of said overturning temple (5) is determined by the corresponding inclination according to which the front-piece of the frame is cut, in order to accomplish a planar surface (8), perpendicular to said axis (9), on which the mutual rotation occurs between said overturning temple (5) with the relative hinge (6) and the remaining part of the frame front-piece.

10. The frame for glasses as in claim 8, wherein said set inclination ($\alpha$) of the overturning axis (9) of said overturning temple (5) is determined by the corresponding inclination according to which a notch (7) is provided in the end piece of the frame front-piece in order to form a pair of opposite flat surfaces, perpendicular to said axis (9), between which is pivoted the perforated end of said overturning temple (5) to determine the mutual rotation between said overturning temple (5) with the relative hinge (6), and the remaining part of the frame front-piece.

11. The frame for glasses as in claim 8, wherein the value of said set inclination ($\alpha$) of the overturning axis (9) is selected, within the above mentioned range of values, so that said overturning temple (5), after being 180° overturned and furthermore folded into the rest position about its hinge, fully overlaps, with its terminal portion, a rim (2, 3) of the frame.

12. The frame for glasses as in claim 7, wherein said set inclination ($\alpha$) of the overturning axis of said overturning temple (5) is determined by the corresponding inclination according to which the front-piece of the frame is cut, in order to accomplish a planar surface (8), perpendicular to said axis (9), on which the mutual rotation occurs between said overturning temple (5) with the relative hinge (6) and the remaining part of the frame front-piece.

13. The frame for glasses as in claim 7, wherein said set inclination ($\alpha$) of the overturning axis (9) of said overturning temple (5) is determined by the corresponding inclination according to which a notch (7) is provided in the end piece of the frame front-piece in order to form a pair of opposite flat surfaces, perpendicular to said axis (9), between which is pivoted the perforated end of said overturning temple (5) to determine the mutual rotation between said overturning temple (5) with the relative hinge (6), and the remaining part of the frame front-piece.

14. The frame for glasses as in claim 7, wherein the value of said set inclination ($\alpha$) of the overturning axis (9) is selected, within the above mentioned range of values, so that said overturning temple (5), after being 180° overturned and furthermore folded into the rest position about its hinge, fully overlaps, with its terminal portion, a rim (2, 3) of the frame.

15. The frame for glasses as in claim 1, wherein said set inclination ($\alpha$) of the overturning axis of said overturning temple (5) is determined by the corresponding inclination according to which the front-piece of the frame is cut, in order to accomplish a planar surface (8), perpendicular to said axis (9), on which the mutual rotation occurs between said overturning temple (5) with the relative hinge (6) and the remaining part of the frame front-piece.

16. The frame for glasses as in claim 15, wherein said set inclination ($\alpha$) of the overturning axis (9) of said overturning temple (5) is determined by the corresponding inclination according to which a notch (7) is provided in the end piece of the frame front-piece in order to form a pair of opposite flat surfaces, perpendicular to said axis (9), between which is pivoted the perforated end of said overturning temple (5) to determine the mutual rotation between said overturning temple (5) with the relative hinge (6), and the remaining part of the frame front-piece.

17. The frame for glasses as in claim 1, wherein said set inclination ($\alpha$) of the overturning axis (9) of said overturning temple (5) is determined by the corresponding inclination according to which a notch (7) is provided in the end piece of the frame front-piece in order to form a pair of opposite flat surfaces, perpendicular to said axis (9), between which is pivoted the perforated end of said overturning temple (5) to determine the mutual rotation between said overturning temple (5) with the relative hinge (6), and the remaining part of the frame front-piece.

18. The frame for glasses as in claim 1, wherein the value of said set inclination ($\alpha$) of the overturning axis (9) is selected, within the above mentioned range of values, so that said overturning temple (5), after being 180° overturned and furthermore folded into the rest position about its hinge, fully overlaps, with its terminal portion, a rim (2, 3) of the frame.

19. The frame for glasses as in claim 1, wherein the value of said set inclination ($\alpha$) of the overturning axis (9) ranges from 5° to 25°.

20. The frame for glasses as in claim 1, further comprising a bridge (1) connecting said rims.

* * * * *